United States Patent [19]
Bohmer

[11] 4,199,166
[45] Apr. 22, 1980

[54] TANDEM WHEEL APPARATUS

[76] Inventor: John O. Bohmer, 211 W. Second St., Brooten, Minn. 56316

[21] Appl. No.: 906,088

[22] Filed: May 15, 1978

[51] Int. Cl.$^2$ .................................... B60G 11/14
[52] U.S. Cl. ............................ 280/96.1; 280/676
[58] Field of Search ............... 280/81 R, 81 A, 93, 280/96.1, 666, 667, 668, 676, 677, 685

[56] References Cited

U.S. PATENT DOCUMENTS

| | | | |
|---|---|---|---|
| 2,065,071 | 12/1936 | Harris | 280/661 |
| 2,333,107 | 11/1943 | Knox | 280/679 |
| 2,935,334 | 5/1960 | Felts | 280/666 |
| 3,041,082 | 6/1962 | Burkdoll | 280/81 R |
| 3,369,824 | 2/1968 | Bunch | 280/685 |
| 3,387,857 | 6/1968 | Roberts | 280/685 |
| 4,042,259 | 8/1977 | Fiedler | 280/668 |

*Primary Examiner*—Robert R. Song
*Assistant Examiner*—John A. Carroll
*Attorney, Agent, or Firm*—Kinney, Lange, Braddock, Westman and Fairbairn

[57] ABSTRACT

Adjustment of the individual camber and toe-in of tandem wheels is provided through apparatus including first and second shafts which are pivotally and rotatably connected to a frame. First and second axle support members are connected to the first and second shafts. First and second axles are connected to the first and second axle support members and define first and second axle axes about which the first and second wheels may rotate. Adjustment of the toe-in and camber is provided by first and second adjusting members which adjusts the orientation of the first and second shaft axes. This results in adjustment of the orientation of the first and second axle axes, respectively, and, therefore the toe-in and camber of the wheels attached to the axles.

11 Claims, 5 Drawing Figures

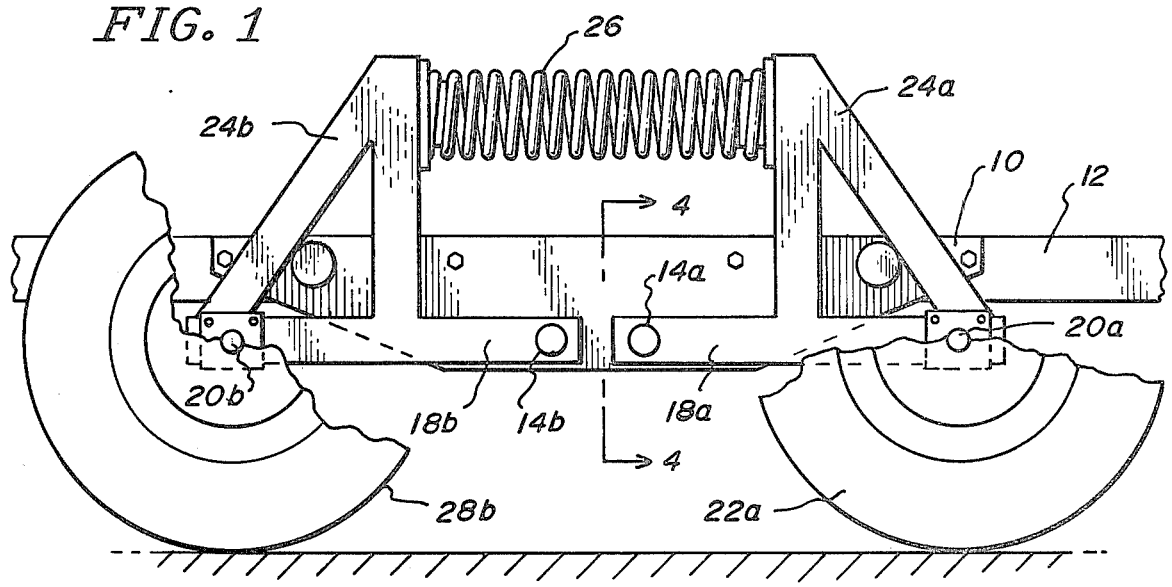
FIG. 1
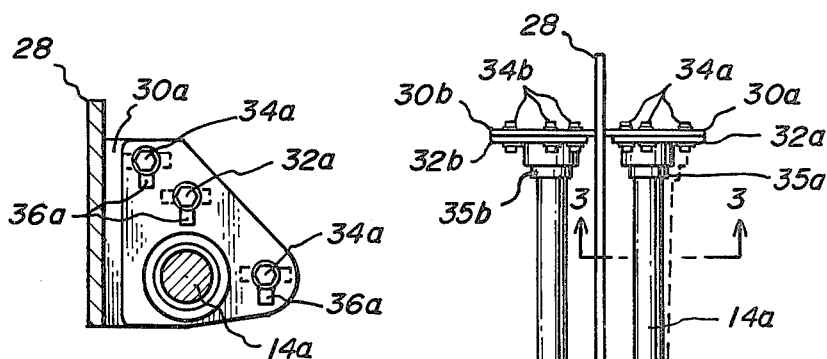
FIG. 3    FIG. 2
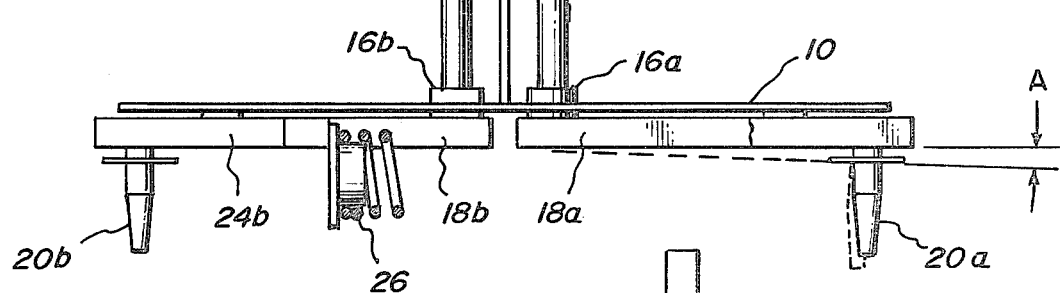
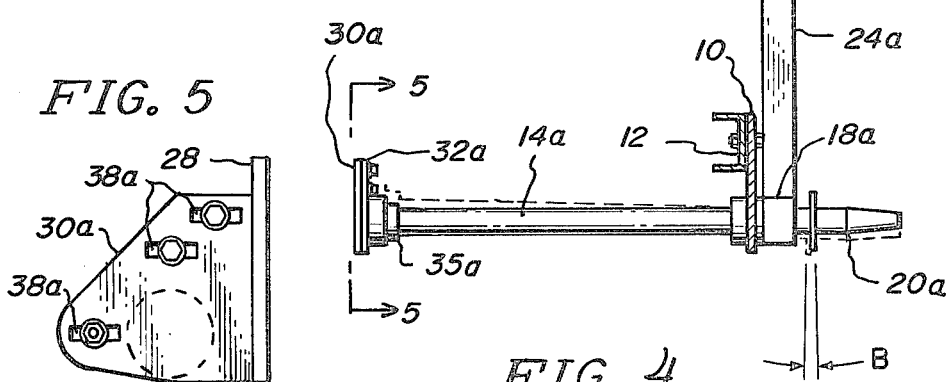
FIG. 5    FIG. 4

TANDEM WHEEL APPARATUS

BACKGROUND OF THE INVENTION

The present invention relates to apparatus for adjusting camber and toe-in of a wheel of a vehicle. In particular, the present invention relates to a camber and toe-in adjustment which is especially useful for tandem wheels on a recreational vehicle or the like.

Recreational vehicles have become very popular in recent years. One type of recreational vehicle uses a front wheel drive arrangement with tandem rear wheels on each side. One arrangement of the tandem wheels which has been used includes individual "swing axles" for each of the two wheels together with a load or bias spring. The two "swing axles" include axle support members which are rotatably connected to a frame at one end and have the wheel supporting axles at their opposite ends. Depending upon loading of the vehicle, the two swing axles can rotate and thereby vary the spacing of the two wheel supporting axles. The load spring applies a biasing force which opposes rotation of the swing axle caused by increasing weight of the vehicle over the tandem wheel assembly.

It has been found that tandem wheel assemblies of this type on recreational vehicles suffer from an important shortcoming. Any wear or damage cannot be corrected on existing units and normal wear of the supports causes excessive tire wear. The axles cannot be aligned individually and any adjustments are difficult or next to impossible to make.

SUMMARY OF THE INVENTION

The present invention is an apparatus for adjusting the camber and/or caster of an individual wheel of a vehicle. The invention has been used to particular advantage in tandem wheel assemblies on recreational vehicles to significantly reduce tire wear.

The apparatus of the present invention includes first shaft means which defines a first shaft axis, first connecting means, a first axle support member, first axle means, and first adjusting means. The first connecting means pivotally and rotatably connects the first shaft means to the frame. The first axle support member is connected to the first shaft means for rotating about the first shaft axis. The first axle means is connected to the first axle support member and defines a first axle axis about which a first wheel may rotate.

Adjustment of the first axle axis is provided by the first adjusting means. The orientation of the first shaft axis is adjusted by the first adjusting means, which in turn adjusts the orientation of the first axle axis.

BRIEF DESCRIPTION OF THE DRAWINGS

FIG. 1 is a side view of a tandem wheel apparatus including the camber and toe-in adjustment of the present invention.

FIG. 2 is a top view of the tandem wheel apparatus.

FIG. 3 is a sectional view along section 3—3 of FIG. 2.

FIG. 4 is a cross-sectional view along section 4—4 of FIG. 1.

FIG. 5 is a view along section 5—5 of FIG. 4.

DETAILED DESCRIPTION OF THE PREFERRED EMBODIMENTS

FIGS. 1 and 2 show side and top views of the tandem wheel apparatus of the present invention, which may be used, for example, as the rear tandem wheels of a front wheel drive recreational vehicle. Mounting plate 10 is attached to a longitudinal chassis frame member 12. Mounting plate 10 may be attached by bolts or may be welded to frame member 12.

First and second shafts 14a and 14b extend through self-aligning bearings 16a and 16b, which are attached to mounting plate 12. In one preferred embodiment, self-aligning bearings 16a and 16b are No. B32-LSS bearings sold by Roller Bearing Co. of America. Self-aligning bearings have spherical seats for the outer races and not only permit rotation of shafts 14a and 14b about their respective longitudinal axes, but also permit universal pivoting of the shafts about an infinite number of radial axes lying in a plane perpendicular to the respective shaft longitudinal axis. This provides a gimbal like action of shafts 14a and 14b at the bearings 16 and 16b. As will be described later, this allows change in the orientation of the first and second shaft axes which results in an adjustment of wheel camber and/or toe-in.

Support members 18a and 18b are attached to one end of shafts 14a and 14b in generally horizontal opposite directions. The opposite end of first axle support member 18a mounts first axle spindle 20a. Similarly, at the opposite end of axle support member 18b second axle spindle 20b is mounted. Ground engaging wheels 22a and 22b (shown partially in FIG. 1) are mounted on first and second axles 20a and 20b and rotate about the axes defined by axles 20a and 20b.

Attached to axle support members 18a and 18b are upwardly extending brackets 24a and 24b, respectively. Bias spring 26 extends between brackets 24a and 24b to resiliently urge them apart. For clarity, bracket 24a and spring 26 are broken away in FIG. 2. First axle support member 18a is urged in a clockwise direction about the first shaft axis and second axle support member 18b is urged in a counterclockwise direction about the second shaft axis. The force applied by spring 26, therefore, opposes the pivotal rotation of support members 18a and 18b caused by the weight of the vehicle being supported by wheels 22a and 22b on axles 20a and 20b.

Extending on the opposite side of mounting plate 10 from support members 18a and 18b is a shaft adjustment support plate 28. Fixed plates 30a and 30b are fixedly attached to plate 28 and are at essentially right angles to plate 28. Shaft receiving plate 32a is connected to fixed plate 30a by bolts 34a. First mounting bearing 35a, which is attached to shaft receiving plate 32a, receives the opposite end of first shaft 14a while allowing shaft 14a to rotate about the first shaft axis.

Similarly, second shaft receiving plate 32b is attached to fixed plate 30b by bolts 34b. Second mounting bearing 35b, which is attached to second shaft receiving plate 32b, receives the opposite end of second shaft 14b and allows second shaft 14b to rotate about its second shaft axis.

The toe-in and camber of axles 20a and 20b is adjusted by adjusting the orientation of the first and the second shaft axes, respectively. As shown in FIGS. 3 and 5, plate 32a contains generally vertically elongated slots 36a, and plate 30a contains horizontally elongated slots 38a. This permits adjustment of the position of plate 32a with respect to plate 30a in both a vertical and a horizontal direction by loosening bolts 34a and sliding them either vertically in slots 36a or horizontally in slots 38a. FIG. 2 illustrates the effect of shifting the position of bolts 34a in horizontal slots 38a, thereby displacing plate 32a and the end of shaft 14a in a horizontal direction. Since bearing 16a is a self-aligning bearing, which permits shaft 14a to universally pivot about axes in a radial plane as well as rotate about its longitudinal axis, the displacement of plate 32a in a horizontal direction results in the vertical plane of the ground-engaging wheel that is perpendicular to the first axle axis being adjustably inclined by an angle A about a vertical axis.

FIG. 4 illustrates the effect of varying the position of plate 32a with respect to plate 30a in the vertical direction. This causes a change in the orientation of the first axle axis. The result is a shift in the generally vertical plane of the ground-engaging wheels 20a to a position which is inclined by an angle B about a horizontal fore and aft axis. The outer end bearing 35a (and 35b) also may be self-aligning, and may be repositioned axially on the shaft after the desired angular adjustment has been made, if necessary.

The present invention, therefore, permits individual adjustment of the camber and toe-in of wheels 22a and 22b by shifting the orientation of the axes of first and second axles 20a and 20b, respectively. This is the result of shifts in the orientation of the first and second shaft axes by the repositioning of plates 32a and 32b with respect to plates 30a and 30b.

The individual adjustment of camber and toe-in of the tandem wheels can yield significant reduction in tire wear, which may otherwise become excessive under certain conditions. The present invention has been used successfully on a recreational vehicle and has been found to substantially reduce tire wear.

Although the present invention has been described with reference to preferred embodiments, workers skilled in the art will recognize that changes may be made in form and detail without departing from the spirit and scope of the invention. For example, although a particular arrangement using parallel plates 30a and 32a (and 30b and 32b) has been shown, it is clear that other plates and bracket arrangements which permit adjustment of the ends of shafts 14a and 14b in horizontal and vertical directions may be used. For example, two orthogonal brackets, one of which is slidably connected to plate 28 may be used.

what is claimed is:

1. In a vehicle having a frame and having a first wheel, the improvement comprising:
   first shaft means defining a first shaft longitudinal axis;
   first connecting means for connecting the first shaft means to the frame to permit pivoting of the first shaft about radial axes and rotating the first shaft about the first shaft longitudinal axis;
   a first axle support member fixedly connected to the first shaft means and extending generally radially therefrom for rotating with the first shaft about the first shaft longitudinal axis;
   first axle means connected to the first axle support member at position spaced from the first shaft longitudinal axis for supporting the first wheel, the first axle means defining a first axle axis about which the first wheel may rotate; and
   first adjusting means spaced from the first connecting means for adjusting the orientation of the first shaft longitudinal axis to adjust the orientation of the first axle axis with respect to a reference plane.

2. The invention of claim 1 and further comprising:
   biasing means for applying a force which opposes rotation of the first axle support member about the first shaft longitudinal axis caused by the weight of the vehicle.

3. The invention of claim 1 wherein the first connecting means comprises:
   first self-aligning bearing means for supporting the first shaft means at a position between its ends; and
   mounting means for mounting the first self-aligning bearing means to the frame.

4. The invention of claims 1 or 3 wherein the first axle support member is connected to the first shaft means proximate one end of the first shaft means, and wherein the first adjusting means engages the first shaft means proximate an opposite end of the first shaft means.

5. The invention of claim 4 wherein the first adjusting means comprises:
   a shaft adjustment support member forming a portion of said frame
   first mounting bearing means engaging the first shaft means proximate the opposite end; and
   first adjustable positioning means for adjustably positioning the first mounting bearing means with respect to the shaft adjustment support member.

6. The invention of claim 5 wherein the first adjustable positioning means comprises:
   a first plate fixedly attached to and essentially orthogonal to the shaft adjustment support member;
   a second plate having the first mounting bearing means connected thereto; and
   adjustable connecting means for connecting the second plate to the first plate at an adjustable position.

7. The invention of claim 6 wherein the adjustable connecting means permits adjustment of the second plate with respect to the first plate in generally horizontal and vertical directions.

8. The invention of claim 7 wherein the adjustable connecting means comprises:
   a plurality of generally horizontal elongated slots in one of the first and second plates;
   a plurality of generally vertical elongated slots in the other of the first and second plates; and
   bolt means extending through the respective horizontal and vertical elongated slots to connect the first and second plates together.

9. The invention of claim 1 and further comprising:
   second shaft means defining a second shaft longitudinal axis generally parallel to the first shaft longitudinal axis;
   second connecting means for pivotally and rotatably connecting the second shaft means to the frame;
   a second axle support member connected to the second shaft means for rotating about the second shaft axis, the second axle support member extending radially from the second shaft axis in a generally opposite direction to the first axle support member;
   second axle means connected to the second axle support member for supporting a second wheel, the second axle means defining a second axle axis about which the second wheel may rotate; and
   second adjusting means for adjusting the orientation of the second shat axis to adjust the orientation of the second axle axis.

10. The invention of claim 9 and further comprising:
    biasing means for applying force to the first and second axle support members which opposes rotation of the first and second axle support members about the first and second shaft axes, respectively, caused by the weight of the vehicle.

11. In a vehicle having a frame and having a first wheel for supporting the frame, the improvement comprising:

a generally horizontal shaft;

means on said shaft for rotatably mounting a wheel about a wheel rotational axis which is substantially parallel to shaft axis;

means for mounting said shaft relative to said frame to permit inclining the plane of rotation of a wheel on the means for rotatably mounting a wheel relative to a vertical reference plane including a first universal bearing rotatably mounting said shaft positioned adjacent said wheel, said universal bearing permitting said shaft to be pivoted about axes lying in a plane perpendicular to the shaft longitudinal axis;

and adjustable means to mount an opposite end of said shaft from the means to rotatably mount a wheel at locations spaced from said first bearing relative to said frame permitting said opposite end of said shaft to be moved transversely to the longitudinal axis of the shaft and thereby pivot in said shaft as retained by the universal bearing.

* * * * *